United States Patent
Belotserkovsky et al.

(10) Patent No.: US 6,628,735 B1
(45) Date of Patent: Sep. 30, 2003

(54) CORRECTION OF A SAMPLING FREQUENCY OFFSET IN AN ORTHOGONAL FREQUENCY DIVISION MULTIPLEXING SYSTEM

(75) Inventors: Maxim B. Belotserkovsky, Indianapolis, IN (US); Louis Robert Litwin, Jr., Carmel, IN (US)

(73) Assignee: Thomson Licensing S.A., Boulogne Cedex (FR)

(*) Notice: Subject to any disclaimer, the term of this patent is extended or adjusted under 35 U.S.C. 154(b) by 0 days.

(21) Appl. No.: 09/471,457

(22) Filed: Dec. 22, 1999

(51) Int. Cl.[7] ............................................. H04L 7/00
(52) U.S. Cl. ........................ 375/355; 370/203; 370/503
(58) Field of Search ............................... 370/210, 208, 370/503, 203; 375/260, 326, 355

(56) References Cited

U.S. PATENT DOCUMENTS

| | | | |
|---|---|---|---|
| 5,003,552 A | 3/1991 | Mower | 375/1 |
| 5,444,697 A | 8/1995 | Leung et al. | 370/19 |
| 5,537,121 A | 7/1996 | Lennen | 342/357 |
| 5,550,812 A | * 8/1996 | Philips | 370/203 |
| 5,608,764 A | 3/1997 | Sugita et al. | 375/344 |
| 5,652,772 A | 7/1997 | Isaksson et al. | 375/367 |
| 5,694,389 A | 12/1997 | Seki et al. | 370/208 |
| 5,710,792 A | 1/1998 | Fukawa et al. | 375/229 |
| 5,726,974 A | 3/1998 | Kunieda et al. | 370/206 |

(List continued on next page.)

FOREIGN PATENT DOCUMENTS

| | | | | |
|---|---|---|---|---|
| WO | WO 99/27671 | * | 6/1999 | H04J/11/00 |

OTHER PUBLICATIONS

H.Nogami et al., "A Frequency and Timing Period Acquisition Technique for OFDM Systems", The Sixth IEEE International Symposium on Personal, Indoor and Mobile Radio Communications, PIMRC'95, Toronto, Canada, Sep. 27–29, 1995, pp. 1010–1015.

J. Rinne et al., "An Equalization Method For Orthogonal Frequency Division Multiplexing Systems In Channels With Multipath Propagation, Frequency Offset And Phase Noise", IEEE Globecom 1996, London, Nov. 18–22, 1996, Conference Record vol. 2 of 3, pp. 1442–1446.

J. A. C. Bingham, "Multicarrier Modulation For Data Transmission: An Idea Whose Time Has Come", May 1990—IEEE Communications Magazine.

J. A. Cioffi, "A Multicarrier Primer" (Tutorial), Amati Communications Corporation and Stanford University, pp. 1–18.

D. K. Kim et al., "A New Joint Algorithm Of Symbol Timing Recovery and Sampling Clock Adjustment For OFDM Systems", IEEE Transactions on Consumer Electronics, vol. 44, No. 3, Aug. 1998, pp. 1142–1149.

Hiroshi Nogami, et al., A Frequency and Timing Period Acquisition Technique for OFDM Systems, vol. E 79–B, No. 8, Aug. 1996, pp. 1135–1146.

Pollet, Thierry, et. al., Synchronization with DMT Modulation. vol. 37, No. 4, Apr. 1999, pp. 80–86.

*Primary Examiner*—Stephen Chin
*Assistant Examiner*—Curtis Odom
(74) *Attorney, Agent, or Firm*—Joseph S Tripoli; Ronald H Kurdyla; Vincent E Duffy (57) ABSTRACT

An OFDM (orthogonal frequency division multiplexing) receiver that detects and corrects a sampling frequency offset of a sampled signal. The OFDM receiver samples an incoming signal in the time domain, multiplies the sampled data by a window function to widen the main lobe of each of the predetermined subcarriers' frequency domain spectrum, takes an FFT (fast Fourier transform) of the sampled signal to analyze the frequency domain samples of each predetermined subcarrier, detects a difference in magnitude of the frequency domain samples for each predetermined subcarrier, and generates a sampling frequency error based on the detected changes in magnitude.

18 Claims, 4 Drawing Sheets

U.S. PATENT DOCUMENTS

| | | | |
|---|---|---|---|
| 5,732,113 A | 3/1998 | Schmidl et al. | 375/355 |
| 5,764,630 A | 6/1998 | Natalie et al. | 370/320 |
| 5,771,224 A | 6/1998 | Seki et al. | 370/206 |
| 5,774,450 A | 6/1998 | Harada et al. | 370/206 |
| 5,787,123 A | 7/1998 | Okada et al. | 375/324 |
| 5,790,516 A | 8/1998 | Gudmundson et al. | 370/210 |
| 5,812,523 A | 9/1998 | Isaksson et al. | 370/208 |
| 5,920,598 A | 7/1999 | Hyakudai et al. | 375/316 |

* cited by examiner

CORRECTION OF A SAMPLING FREQUENCY OFFSET IN AN ORTHOGONAL FREQUENCY DIVISION MULTIPLEXING SYSTEM

FIELD OF THE INVENTION

The present invention relates to processing orthogonal frequency division multiplexed (OFDM) signals.

BACKGROUND OF THE INVENTION

Orthogonal frequency division multiplexing (OFDM) is a robust technique for efficiently transmitting data over a channel. The technique uses a plurality of sub-carrier frequencies (sub-carriers) within a channel bandwidth to transmit the data. These sub-carriers are arranged for optimal bandwidth efficiency compared to more conventional transmission approaches, such as frequency division multiplexing (FDM), which waste large portions of the channel bandwidth in order to separate and isolate the sub-carrier frequency spectra and thereby avoid inter-carrier interference (ICI). By contrast, although the frequency spectra of OFDM sub-carriers overlap significantly within the OFDM channel bandwidth, OFDM nonetheless allows resolution and recovery of the information that has been modulated onto each sub-carrier.

The transmission of data through a channel via OFDM signals provides several advantages over more conventional transmission techniques. One advantage is the tolerance of OFDM to multipath delay spread. This tolerance is due to the relatively long symbol interval Ts compared to the typical time duration of the channel impulse response. These long symbol intervals prevent inter-symbol interference (ISI). Another advantage is the tolerance of OFDM to frequency selective fading. By including redundancy in the OFDM signal, data encoded onto fading sub-carriers can be reconstructed from the data recovered from the other sub-carriers. Yet another advantage is the efficient spectrum usage in OFDM. Since OFDM sub-carriers are placed in very close proximity to one another without the need to leave unused frequency space between them, OFDM can efficiently fill a channel. A further advantage is the simplified sub-channel equalization of OFDM. OFDM shifts channel equalization from the time domain (as in single carrier transmission systems) to the frequency domain where a bank of simple one-tap equalizers can individually adjust for the phase and amplitude distortion of each sub-channel. A still further advantage is the good interference properties of OFDM. It is possible to modify the OFDM spectrum to account for the distribution of power of an interfering signal. Also, it is possible to reduce out-of-band interference by avoiding the use of OFDM sub-carriers near the channel bandwidth edges.

Although OFDM exhibits these advantages, prior art implementations of OFDM also exhibit several difficulties and practical limitations. One difficulty is the issue of determining and correcting for carrier frequency offset, a major aspect of OFDM synchronization. Ideally, the receive carrier frequency, $f_{cr}$, should exactly match the transmit carrier frequency, $f_{ct}$. If this condition is not met, however, the mis-match contributes to a non-zero carrier frequency offset, delta $f_c$, in the received OFDM signal. OFDM signals are very susceptible to such carrier frequency offset which causes a loss of orthogonality between the OFDM sub-carriers and results in inter-carrier interference (ICI) and a severe increase in the bit error rate (BER) of the recovered data at the receiver.

Another difficulty is that of synchronizing the transmitter's sample rate to the receiver's sample rate to eliminate sampling rate offset. Any mis-match between these two sampling rates results in a rotation of the $2^m$-ary sub-symbol constellation from symbol to symbol in a frame for smaller frequency offsets. However, for larger frequency offsets, the result is a contraction or expansion of the frequency spectrum of the received signal. Both of these can contribute to increased BER. One cause of sampling rate offset is the presence of a sampling frequency offset. A sampling frequency offset occurs when the receiver samples the received signal at a frequency that is either higher or lower than the sample rate used at the transmitter. A sampling frequency offset can be detrimental to the performance of the receiver, and must be corrected for in order for the receiver to be properly synchronized. The present invention is directed to the correction of this problem.

SUMMARY OF THE INVENTION

An OFDM receiver samples an incoming signal in the time domain, multiplies the sampled data by a window function to lower the sidelobes of the frequency domain spectrum of each of the predetermined subcarriers in order to reduce interference between the predetermined subcarriers and also to widen the main lobe such that samples of sufficient magnitude (relative to the noise floor) will be available on either side of the main peak, takes an FFT (fast Fourier transform) of the sampled signal to analyze the frequency domain samples of each predetermined subcarrier, detects a difference in magnitude of the frequency domain samples on either side of each predetermined subcarrier, and generates a sampling frequency error based on the detected differences in magnitude.

BRIEF DESCRIPTION OF THE DRAWINGS

The present invention will be more fully understood as a result of a detailed description of the preferred embodiment when taken in conjunction with the accompanying drawings in which.

DETAILED DESCRIPTION OF THE PREFERRED EMBODIMENT

The characteristics and advantages of the present invention will become more apparent from the following description, given by way of example.

Figure 1:
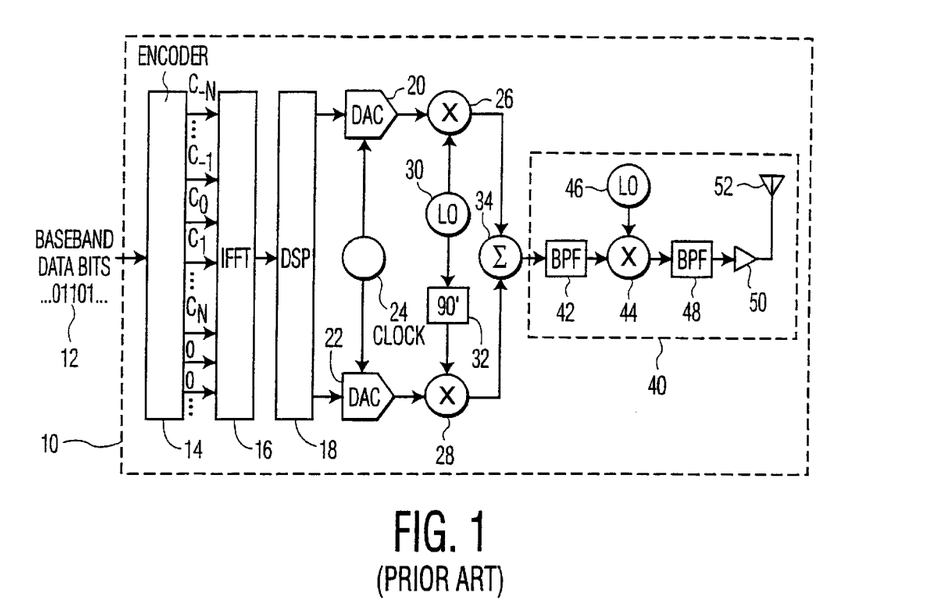
FIG. 1 is a block diagram of a conventional OFDM transmitter.

The general principles of OFDM signal transmission can be described with reference to FIGS. 1–4. Turning now to FIG. 1, a block diagram of a conventional OFDM transmitter 10 is shown. OFDM transmitter 10 receives a stream of baseband data bits 12 as its input. These input data bits 12 are fed into an encoder 14, which takes these data bits 12 in segments of B bits every $T_g+T_s$ seconds, where $T_s$ is an OFDM symbol interval and $T_g$ is a cyclic prefix or guard interval. Encoder 14 typically uses a block and/or convolutional coding scheme to introduce error-correcting and/or error-detecting redundancy into the segment of B bits and then sub-divides the coded bits into 2N sub-segments of m bits. The integer m typically ranges from 2 to 6.

In a typical OFDM transmission system, there are 2N+1 OFDM sub-carriers, including the zero frequency DC sub-carrier which is not generally used to transmit data since it has no frequency and therefore no phase. Accordingly, encoder 14 then typically performs $2^m$-ary quadrature amplitude modulation (QAM) encoding of the 2N sub-segments of m bits in order to map the sub-segments of m bits to predetermined corresponding complex-valued points in a $2^m$-ary constellation. Each complex-valued point in the constellation represents discrete values of phase and amplitude. In this way, encoder 14 assigns to each of the 2N sub-segments of m bits a corresponding complex-valued $2^m$-ary QAM sub-symbol $C_k=a_k+jb_k$, where $-N \leq k \leq N$, in order to create a sequence of frequency-domain sub-symbols that encodes the B data bits. Also, the zero-frequency sub-carrier is typically assigned $c_0=0$. Encoder 14 then passes the sequence of sub-symbols, along with any additional zeroes that may be required for interpolation to simplify filtering, onto an inverse discrete Fourier transformer (IDFT) or, preferably, an inverse fast Fourier transformer (IFFT) 16.

Upon receiving the sequence of OFDM frequency-domain sub-symbols from encoder 14, IFFT 16 performs an inverse fast Fourier transform on the sequence of sub-symbols. In other words, it uses each of the complex-valued sub-symbols, $C_k$, to modulate the phase and amplitude of a corresponding one of 2N+1 sub-carrier frequencies over a symbol interval Ts. The sub-carriers are given by $e^{-2\pi j f_k t}$, and therefore, have baseband frequencies of $f_k=k/T_s$, where k is the frequency number and is an integer in the range $-N \leq k \leq N$. IFFT 16 thereby produces a digital time-domain OFDM symbol of duration $T_s$ given by:

$$u(t)=\Sigma ck\ e^{2\pi j f k t}$$

$$0<t<T_s$$

Figure 2:
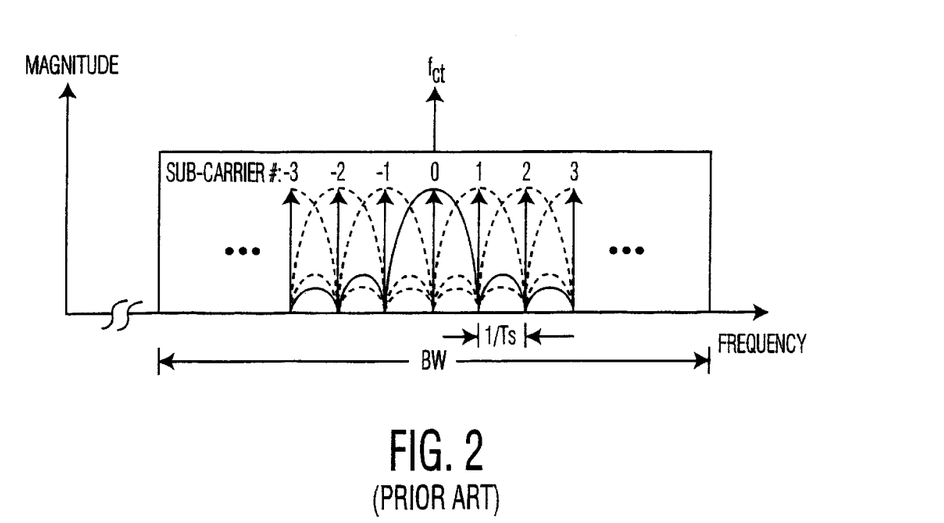
FIG. 2 is an illustration of an OFDM signal within an OFDM channel bandwidth showing the frequency domain positioning of OFDM sub-carriers and their modulated spectra.

As a result of this discrete-valued modulation of the OFDM sub-carriers by frequency-domain sub-symbols over symbol intervals of $T_s$ seconds, the OFDM sub-carriers each display a sinc x=(sin x)/x spectrum in the frequency domain. By spacing each of the 2N+1 sub-carriers $1/T_s$ apart in the frequency domain, the primary peak of each sub-carrier's sinc x spectrum coincides with a null of the spectrum of every other sub-carrier. In this way, although the spectra of the sub-carriers overlap, they remain orthogonal to one another. FIG. 2 illustrates the arrangement of the OFDM sub-carriers as well as the envelope of their modulated spectra within an OFDM channel bandwidth, BW, centered around a carrier frequency, $f_{cr}$. Note that the modulated sub-carriers fill the channel bandwidth very efficiently.

Returning to FIG. 1, the digital time-domain OFDM symbols produced by IFFT 16 are then passed to a digital signal processor (DSP) 18. DSP 18 performs additional spectral shaping on the digital time-domain OFDM symbols and also adds a cyclic prefix or guard interval of length $T_g$ to each symbol. The cyclic prefix is generally just a repetition of part of the symbol. This cyclic prefix is typically longer than the OFDM channel impulse response and, therefore, acts to prevent inter-symbol interference (ISI) between consecutive symbols.

The real and imaginary-valued digital components that make up the cyclically extended, spectrally-shaped digital time-domain OFDM symbols are then passed to digital-to-analog converters (DACs) 20 and 22, respectively. DACs 20 and 22 convert the real and imaginary-valued digital components of the time-domain OFDM symbols into in-phase and quadrature OFDM analog signals, respectively, at a conversion or sampling rate $f_{ck\_t}$ as determined by a clock circuit 24. The in-phase and quadrature OFDM signals are then passed to mixers 26 and 28, respectively.

In mixers 26 and 28, the in-phase and quadrature OFDM signals from DACs 20 and 22 are used to modulate an in-phase intermediate frequency (IF) signal and a 90 degree phase-shifted (quadrature) IF signal, respectively, in order to produce an in-phase IF OFDM signal and a quadrature IF OFDM signal, respectively. The in-phase IF signal that is fed to mixer 26 is produced directly by a local oscillator 30, while the 90° phase-shifted IF signal that is fed to mixer 28 is produced by passing the in-phase IF signal produced by local oscillator 30 through a 90° phase-shifter 32 before feeding it to mixer 28. These two in-phase and quadrature IF OFDM signals are then combined in combiner 34 to form a composite IF OFDM signal. In some conventional transmitters, the IF mixing is performed in the digital domain using a digital synthesizer and digital mixers before the digital-to-analog conversion is performed.

This composite IF OFDM signal is then passed into radio frequency (RF) transmitter 40. Many variations of RF transmitter 40 exist and are well known in the art, but typically, RF transmitter 40 includes an IF bandpass filter 42, an RF mixer 44, an RF carrier frequency local oscillator 46, an RF bandpass filter 48, an RF power amplifier 50, and an antenna 52. RF transmitter 40 takes the IF OFDM signal from combiner 34 and uses it to modulate a transmit carrier of frequency $f_{ct}$, generated by RF local oscillator 46, in order to produce an RF OFDM-modulated carrier that occupies a channel bandwidth, BW. Because the entire OFDM signal must fit within this channel bandwidth, the channel bandwidth must be at least $(1/T_s) \cdot (2N+1)$ Hz wide to accommodate all the modulated OFDM sub-carriers. The frequency-domain characteristics of this RF OFDM-modulated carrier are illustrated in FIG. 2. This RF OFDM-modulated carrier is then transmitted from antenna 52 through a channel, to an OFDM receiver in a remote location. In alternative embodiments of RF transmitter 40, the OFDM signal is used to modulate the transmit carrier using frequency modulation (FM), single-sideband modulation (SSB), or other modulation techniques. Therefore, the resulting RF OFDM-modulated carrier may not necessarily have the exact shape of the RF OFDM-modulated carrier illustrated in FIG. 2 (i.e., the RF OFDM-modulated carrier might not be centered around the transmit carrier, but instead may lie to either side of it).

In order to receive the OFDM signal and to recover the baseband data bits that have been encoded into the OFDM sub-carriers at a remote location, an OFDM receiver must perform essentially the inverse of all the operations performed by the OFDM transmitter described above. These operations can be described with reference to FIG. 3 which is a block diagram of a conventional OFDM receiver.

Figure 3:
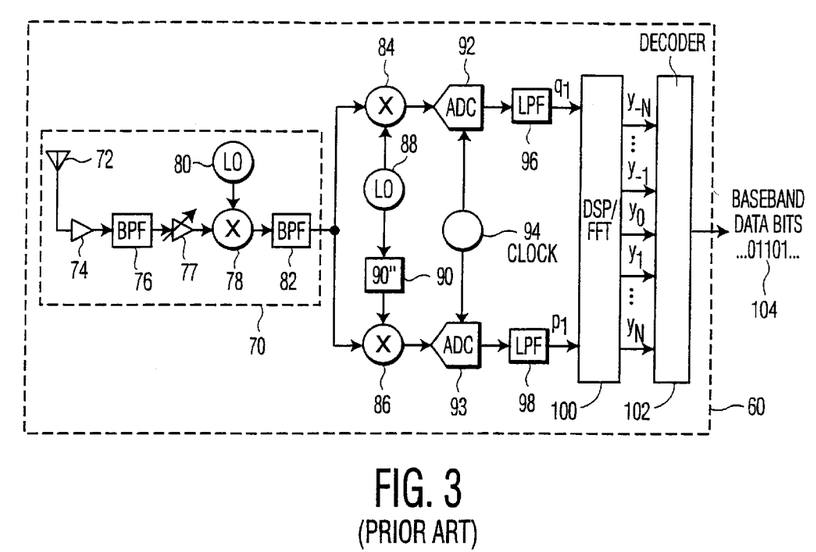
FIG. 3 is a block diagram of a conventional OFDM receiver.

The first element of a typical OFDM receiver 60 is an RF receiver 70. Like RF transmitter 40, many variations of RF receiver 70 exist and are well known in the art, but typically, RF receiver 70 includes an antenna 72, a low noise amplifier (LNA) 74, an RF bandpass filter 76, an automatic gain control (AGC) circuit 77, an RF mixer 78, an RF carrier frequency local oscillator 80, and an IF bandpass filter 82.

Through antenna 72, RF receiver 70 couples in the RF OFDM-modulated carrier after it passes through the channel. Then, by mixing it with a receive carrier of frequency $f_{cr}$ generated by RF local oscillator 80, RF receiver 70 downconverts the RF OFDM-modulated carrier to obtain a received IF OFDM signal. The frequency difference between the receive carrier and the transmit carrier contributes to the carrier frequency offset, delta $f_c$.

This received IF OFDM signal then feeds into both mixer 84 and mixer 86 to be mixed with an in-phase IF signal and a 90° phase-shifted (quadrature) IF signal, respectively, to produce in-phase and quadrature OFDM signals, respectively. The in-phase IF signal that feeds into mixer 84 is produced by an IF local oscillator 88. The 90° phase-shifted IF signal that feeds into mixer 86 is derived from the in-phase IF signal of IF local oscillator 88 by passing the in-phase IF signal through a 90° phase shifter 90 before feeding it to mixer 86.

The in-phase and quadrature OFDM signals then pass into analog-to-digital converters (ADCs) 92 and 93, respectively, where they are digitized at a sampling rate $f_{ck\_r}$ as determined by a clock circuit 94. ADCs 92 and 93 produce digital samples that form an in-phase and a quadrature discrete-time OFDM signal, respectively. The difference between the sampling rates of the receiver and that of the transmitter is the sampling rate offset, delta $f_{ck} = f_{ck\_r} - f_{ck\_t}$.

The unfiltered in-phase and quadrature discrete-time OFDM signals from ADCs 92 and 93 then pass through digital low-pass filters 96 and 98, respectively. The output of lowpass digital filters 96 and 98 are filtered in-phase and quadrature samples, respectively, of the received OFDM signal. In this way, the received OFDM signal is converted into in-phase ($q_i$) and quadrature ($p_i$) samples that represent the real and imaginary-valued components, respectively, of the complex-valued OFDM signal, $r_i = q_i + jp_i$. These in-phase and quadrature (real-valued and imaginary-valued) samples of the received OFDM signal are then delivered to DSP 100. Note that in some conventional implementations of receiver 60, the analog-to-digital conversion is done before the IF mixing process. In such an implementation, the mixing process involves the use of digital mixers and a digital frequency synthesizer. Also note that in many conventional implementations of receiver 60, the digital-to-analog conversion is performed after the filtering.

DSP 100 performs a variety of operations on the in-phase and quadrature samples of the received OFDM signal. These operations may include: a) synchronizing receiver 60 to the timing of the symbols and data frames within the received OFDM signal, b) removing the cyclic prefixes from the received OFDM signal, c) computing the discrete Fourier transform (DFT) or preferably the fast Fourier transform (FFT) of the received OFDM signal in order to recover the sequences of frequency-domain sub-symbols that were used to modulate the sub-carriers during each OFDM symbol interval, d) performing any required channel equalization on the sub-carriers, and e) computing a sequence of frequency-domain sub-symbols, $y_k$, from each symbol of the OFDM signal by demodulating the sub-carriers of the OFDM signal by means of the FFT calculation. DSP 100 then delivers these sequences of sub-symbols to a decoder 102.

Decoder 102 recovers the transmitted data bits from the sequences of frequency-domain sub-symbols that are delivered to it from DSP 100. This recovery is performed by decoding the frequency-domain sub-symbols to obtain a stream of data bits 104 which should ideally match the stream of data bits 12 that were fed into the OFDM transmitter 10. This decoding process can include soft Viterbi decoding and/or Reed-Solomon decoding, for example, to recover the data from the block and/or convolutionally encoded sub-symbols.

Figure 4:
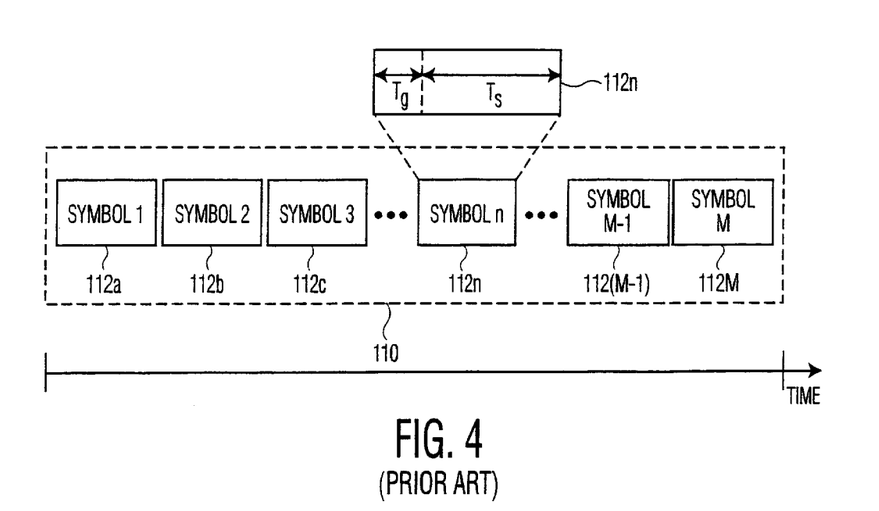
FIG. 4 illustrates a typical arrangement of OFDM symbols and their corresponding guard intervals within a data frame.

In a typical OFDM data transmission system such as one for implementing digital television or a wireless local area network (WLAN), data is transmitted in the OFDM signal in groups of symbols known as data frames. This concept is shown in FIG. 4 where a data frame 100 includes M consecutive symbols 112a, 112b, ..., 112M, each of which includes a guard interval, $T_g$, as well as the OFDM symbol interval, Ts. Therefore, each symbol has a total duration of $T_g + T_s$ seconds. Depending on the application, data frames can be transmitted continuously, such as in the broadcast of digital TV, or data frames can be transmitted at random times in bursts, such as in the implementation of a WLAN.

Referring now to FIGS. 5–8, an exemplary embodiment of the present invention is shown. Although the present invention is illustrated as being distinct from the elements of OFDM receiver of FIG. 3, one skilled in the art will readily devise that the present invention may be integrated with the elements of the OFDM receiver. For example, the present invention may be combined with ADCs 92 and 93 and clock circuit 94 of OFDM receiver 60. However, the present invention is illustrated as a distinct sampling frequency correction loop for clarity, ease of reference, and to facilitate an understanding of the present invention.

The present invention is described as operating in a receiver that conforms to the ETSI-BRAN HIPERLAN/2 (Europe) and IEEE 802.11a (USA) wireless LAN standards, herein incorporated by reference. However, it is considered within the skill of one skilled in the art to implement the teachings of the present invention in other OFDM systems.

The above-identified wireless LAN standards propose the use of a training sequence for detection of OFDM transmissions. Briefly, the training sequence (e.g., training sequence A or B) includes a series of short OFDM training symbols (having known amplitudes and phases) that are transmitted over a pre-determined number of pilot sub-carriers or bins (e.g., 12 pilot sub-carriers). All the other sub-carriers (e.g., 52 sub-carriers) remain at zero during the transmission of the training sequence. Although use of the training sequence of the above-identified LAN standards is discussed below, use of alternative training sequences and symbols is considered within the scope of the invention as defined by the appended claims.

Figure 5:
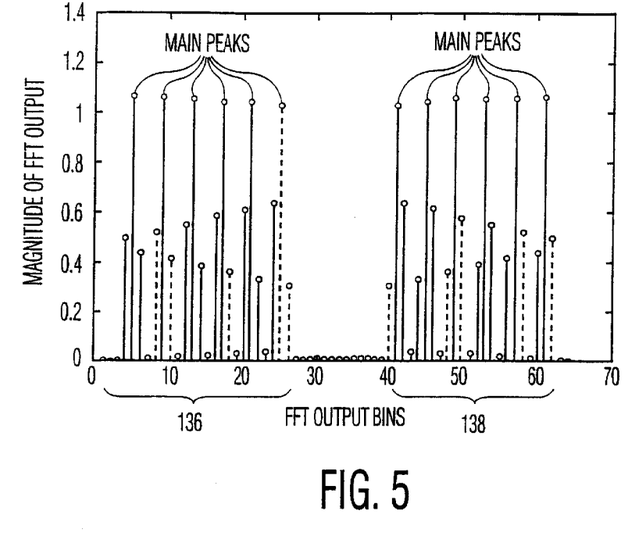
FIG. 5 illustrates 64 FFT output bins of a training sequence when a sampling frequency offset is present.

More specifically, the HIPERLAN/2 short training sequence B consists of 12 non-zero pilot subcarriers and all the other carriers are zero (total of 64 subcarriers). If a sampling frequency offset is present when the time-domain OFDM signal is sampled, the result in the frequency-domain will be a spectrum that is scaled along the frequency axis. Such a scaling will mean that the 12 non-zero pilot subcarriers will no longer be on frequencies that are a multiple of the fundamental frequency. Thus, DFT leakage will occur. The result is that, instead of having a single peak in the FFT output that corresponds to a pilot subcarrier, there is a peak with sidelobes (samples on either side of the main peak), as shown in FIG. 5. By calculating the difference of the sample to the left of the peak and the sample to the right of the peak, a meaningful error can be generated that can be used to successfully update the frequency of the sampler and thus remove the sampling frequency offset.

Figure 6:
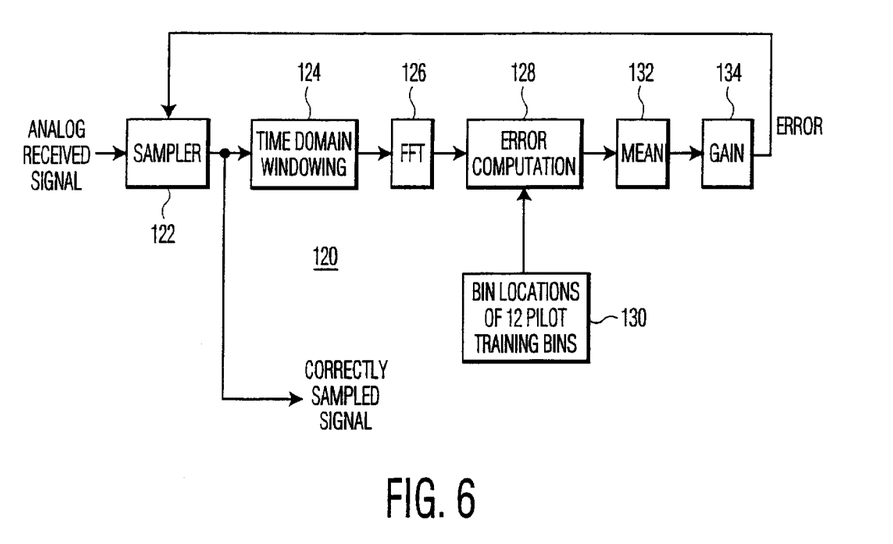
FIG. 6 is a block diagram of an exemplary sampling frequency correction network of the present invention.

Referring now to FIG. 6, a sampling frequency correction network 120 is shown. It should be noted the network 120 may be embodied in software, hardware, or some combination thereof. Network 120 receives a sampled signal from a sampler 122 having analog to digital converters (e.g., ADCs 92 and 93 in FIG. 3) driven by a variable clock circuit (e.g., clock circuit 94 in FIG. 3). As discussed above, sampler 122 may be sampling the received signal at a frequency that is different than the sample rate of the transmitter. This difference in sample rate generates a sampling frequency offset that can be detrimental to the performance of the receiver. Network 120 corrects the frequency offset so the receiver is properly synchronized.

Network 120 includes a time-domain windowing module 124 that multiplies the sampled time domain data, received from sampler 122, by a window function such as a Hamming window, Hanning window, or the like. Applying the window function to the sampled data produces two benefits. First, when the sampled data is analyzed in the frequency domain, i.e. when the sampled data is processed by FFT module 126 and analyzed by error computation module 128, the main lobe of each pilot bin will be widened or spread. Widening the main lobe will increase the number of frequency-domain samples for each pilot bin, as discussed in further detail below. Second, the sidelobes of the pilot bins are lowered and, as a result, cause less interference with neighboring pilot bins.

Figure 7:
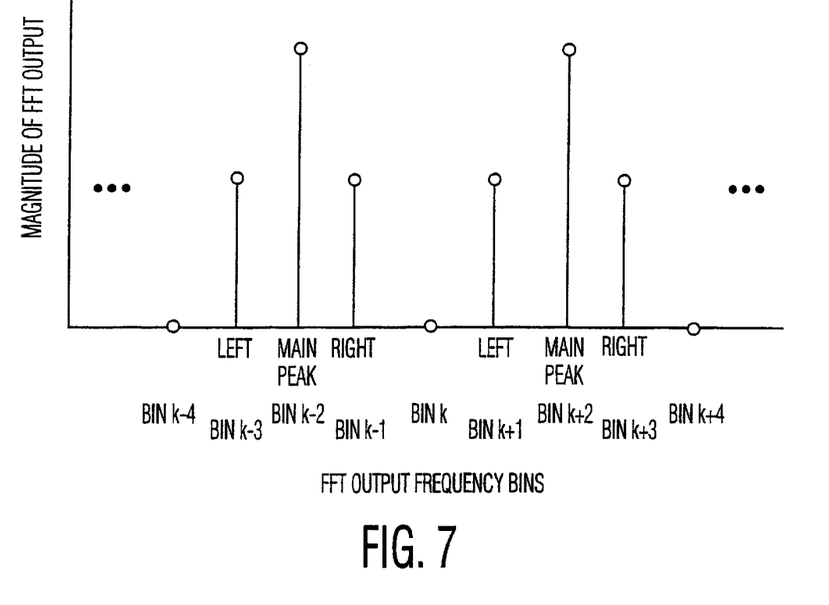
FIG. 7 illustrates FFT output bins when there is no sampling frequency offset.

Time domain windowing module 124 passes the sampled time domain data to FFT module 126 which converts the time-domain samples into the frequency domain. As discussed above, application of the windowing function in the time domain increases the number of frequency samples for the main lobe of each pilot bin. For example, FIG. 7 shows two pilot bins having three frequency-domain samples, i.e. each pilot bin has a main peak and a smaller peak on either side of the main peak. If the windowing function was not applied in the time domain there would likely be only one frequency-domain sample per pilot bin. In other words, only the main peaks would be present in the frequency domain if the windowing function was not applied in the time domain. As discussed in further detail below, the additional frequency-domain samples are needed to generate a frequency offset error.

Figure 8:
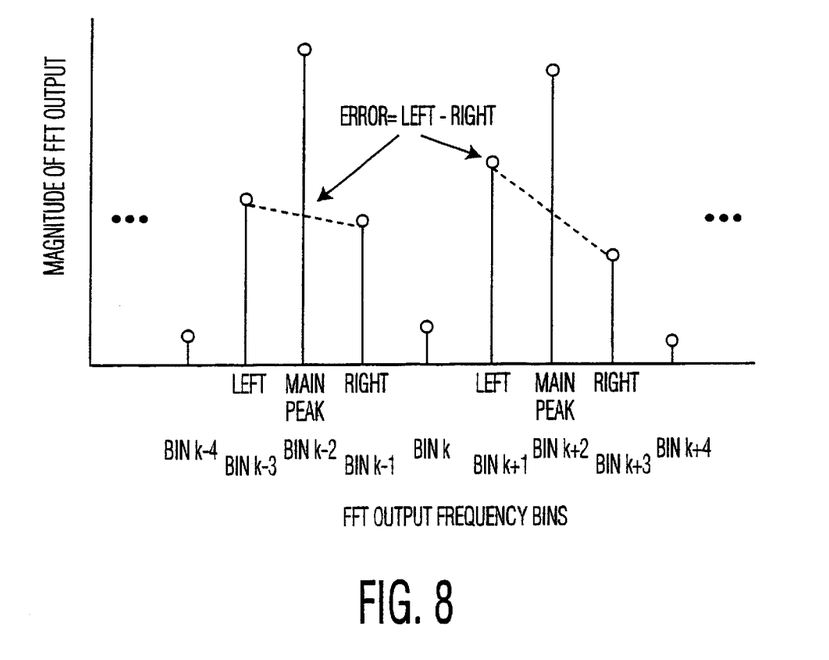
FIG. 8 illustrates FFT output bins when there is a sampling frequency offset.

FFT module 126 passes the frequency-domain samples to an error computation module 128. Error computation module 128 compares the received samples to a stored table 130 of pilot bin indices of a known training sequence to detect the occurrence of main peak frequency-domain samples of the training sequence. When the main peak frequency-domain samples of the training sequence are detected, error computation module 128 analyzes the frequency bins that neighbor each pilot bin of the training sequence to determine if a sampling frequency offset exists. When there is no sampling frequency offset the frequency bins to the left and right of a pilot bin will have the same magnitude, as shown in FIG. 7. However, if there is a sampling frequency offset the frequency bins to the left and right of a pilot bin will have different magnitudes, as shown in FIG. 8.

Upon detection of a sampling frequency offset error, computation module 128 computes an error value for each pilot bin by calculating the difference in magnitude between the frequency bins on either side of each pilot bin. The difference in magnitude may be positive or negative, as shown in FIG. 5, and the sign of the difference needs to be maintained since this contains information about whether the receiver's sampling frequency is too fast or too slow. For a given sampling frequency offset, the magnitude of the sample to the left of a main peak (denote the magnitude of this sample as LEFT) minus the value of the sample to the right of the main peak (denote the magnitude of this sample as RIGHT) will produce a value with a given sign for the first half of the FFT output spectrum, and the sign of that difference will be reversed for the second half of the FFT output spectrum. In order for the error term to have the same sign for the entire spectrum, the error for the first half 136 of the spectrum (i.e., the positive frequency bins from the FFT) must be defined as the opposite of that for the second half 138. That is, the error for the first half can be defined as LEFT—RIGHT, whereas the error for the second half (i.e., the negative frequency bins from the FFT) can be defined as RIGHT-LEFT. The opposite definition can alternatively be used as well (RIGHT—LEFT for the first half, and LEFT-RIGHT for the second half).

Returning to FIG. 6, error computation module 128 outputs the computed error values for the pilot bins to a mean error module 132. Mean error module 132 calculates a mean error value by taking the mean of the computed error values. Afterwards, mean error module 132 outputs the mean error value to a gain module 134 that multiplies the mean error value by a gain factor to generate a scaled error signal that is fed back to sampler 122 to adjust the sampling frequency. The value of the gain controls the convergence speed of the sampling frequency of the OFDM receiver. Thus gain module 134 serves as a first order loop filter.

Thus according to the principle of the present invention, there is provided a method of correcting a sampling frequency offset in an OFDM receiver. The method includes receiving an BFDM signal containing a training symbol on an OFDM pilot subcarrier, sampling the received OFDM signal at a sampling frequency, applying a time-domain window to the sampled OFDM signal such that a main lobe of the OFDM pilot subcarrier is widened, taking a Fast Fourier Transform (FFT) of the windowed OFDM signals such that there are a plurality of frequency-domain samples of the OFDM pilot subcarrier, and generating an error proportional to the sampling frequency offset by analyzing the plurality of frequency-domain samples of the OFDM pilot subcarrier.

According to a feature of the present invention, there is provided an OFDM receiver for receiving an OFDM signal having a training symbol on a pilot subcarrier. The OFDM receiver includes an analog-to-digital converter (ADC) that samples a received analog OFDM signal at a sampling frequency to generate digital OFDM samples, a window module that applies a window function to the digital samples output by the ADC, the window function widening a main lobe of the pilot subcarrier, an FFT that Fast Fourier Transforms the windowed samples output by the window module such that a plurality of frequency samples exist for the pilot subcarrier, and an error computation module that computes a sampling frequency error by analyzing the plurality of frequency samples of the pilot subcarrier.

While the present invention has been described with reference to the preferred embodiments, it is apparent that various changes may be made in the embodiments without departing from the spirit and the scope of the invention, as defined by the appended claims.

What is claimed is:

1. A method of correcting a sampling frequency offset in an Orthogonal Frequency Division Multiplexing (OFDM) receiver, the method comprising the steps of:

receiving an OFDM signal containing a training symbol on an OFDM pilot subcarrier;

sampling the received OFDM signal at a sampling frequency;

widening a main lobe of the OFDM pilot subcarrier;

acquiring a plurality of frequency-domain samples of the OFDM pilot subcarrier;

detecting a peak frequency-domain sample in the plurality of frequency-domain samples of the OFDM pilot subcarrier;

calculating a difference in magnitude between frequency-domain samples positioned on either side of the peak frequency-domain sample of the OFDM pilot subcarrier; and multiplying the calculated difference by a gain factor to generate an error that is proportional to the sampling frequency offset.

2. The method of claim 1, further comprising the step of:

adjusting the sampling frequency in response to the generated error such that the sampling frequency offset converges towards zero.

3. The method of claim 1, wherein the step of widening includes applying a time-domain window to the sampled OFDM signal such that the main lobe of the OFDM pilot subcarrier is widened.

4. The method of claim 1, wherein the step of acquiring the plurality of frequency-domain samples includes Fast Fourier Transforming the sampled OFDM signal.

5. The method of claim 1, wherein the step of detecting the peak frequency-domain sample includes the steps of:

comparing the indices of the frequency-domain samples to a stored index of a known pilot subcarrier; and determining that a peak frequency-domain sample is present when an index of one of the frequency-domain samples matches with the stored index.

6. The method of claim 1, wherein the steps of:

receiving the OFDM signal includes receiving a plurality of training symbols on a plurality of OFDM pilot subcarriers, applying the time-domain window to the sampled OFDM signal includes applying the time-domain window such that the main lobes of the OFDM pilot subcarriers are widened; and Fast Fourier Transforming the windowed OFDM signal includes Fast Fourier Transforming such that there are a plurality of frequency-domain samples for each of the OFDM pilot subcarriers.

7. The method of claim 6, wherein the steps of:

detecting the peak frequency-domain sample includes detecting the peak frequency-domain sample for each of the OFDM pilot subcarriers; and calculating the difference in magnitude includes calculating the difference in magnitude between frequency-domain samples positioned on either side of each peak frequency-domain sample of each of the pilot OFDM subcarriers.

8. The method of claim 7, further comprising the steps of:

calculating a mean difference in magnitude from the calculated differences in magnitude; and multiplying the mean difference in magnitude by the gain factor to generate the error that is proportional to the sampling frequency offset.

9. The method of claim 7, wherein the step of detecting the peak frequency-domain sample for each of the OFDM pilot subcarriers includes the steps of:

comparing the indices of the frequency-domain samples to stored indices of known pilot subcarriers; and determining that a peak frequency-domain sample is present when an index of one of the frequency-domain samples matches an index of one of the stored indices.

10. An Orthogonal Frequency Division Multiplexing (OFDM) Receiver for receiving an OFDM signal having a training symbol on a pilot subcarrier, the OFDM receiver comprising:

an analog-to-digital converter (ADC) that samples a received analog OFDM signal at a sampling frequency to generate digital OFDM samples;

a window module that applies a window function to the digital samples output by the ADC, the window function widening a main lobe of the pilot subcarrier;

an FFT that Fast Fourier Transforms the windowed samples output by the window module such that a plurality of frequency samples exist for the pilot subcarrier;

an error computation module that computes a sampling frequency error by analyzing the plurality of frequency samples of the pilot subcarrier; and a gain module that generates a scaled error signal in response to reception of the sampling frequency error, the scaled error signal causing the ADC to adjust the sampling frequency such that the sampling frequency error converges towards zero.

11. The OFDM receiver of claim 10, wherein the error computation module computes the sampling frequency error by detecting a peak frequency-domain sample in the plurality of frequency domain samples of the OFDM pilot subcarrier and calculating a difference in magnitude between frequency-domain samples positioned on either side of the detected peak frequency-domain sample.

12. The OFDM receiver of claim 11, wherein the error computation module detects the peak frequency-domain sample by comparing indices of the frequency-domain samples to a stored index of a known pilot subcarrier and determining that a peak frequency-domain sample is present when an index of one of the frequency-domain samples matches with the stored index.

13. An apparatus for synchronizing a sampling frequency of a Orthogonal Frequency Division Multiplexing (OFDM) receiver with a sampling frequency of an OFDM transmitter, the apparatus comprising:

means for receiving an OFDM signal containing a plurality of training symbols on a plurality of OFDM pilot subcarriers;

means for sampling the received OFDM signal at a sampling frequency;

means for applying a time-domain window to the sampled OFDM signal such that the main lobes of the OFDM pilot subcarriers are widened;

means for Fast Fourier Transforming the windowed OFDM signals such that there are a plurality of frequency-domain samples for each of the OFDM pilot subcarriers;

means for detecting a peak frequency-domain sample for each of the OFDM pilot subcarriers;

means for calculating a difference in magnitude between frequency-domain samples positioned on either side of each peak frequency-domain sample of each of the pilot OFDM subcarriers;

means for calculating a mean difference in magnitude from the calculated differences in magnitude, and means for multiplying the mean difference in magnitude by a gain factor to generate a sampling frequency error.

14. The apparatus of claim 13, further comprising:

means for adjusting the sampling frequency of the sampling means such that the sampling frequency of the OFDM receiver is synchronized with the sampling frequency of the OFDM transmitter in response to reception of the sampling frequency error.

15. The apparatus of claim 13, wherein the means for detecting the peak frequency-domain sample for each of the OFDM pilot subcarriers further comprises:

means for comparing the indices of the frequency-domain samples to stored indices of known pilot subcarriers; and means for determining that a peak frequency-domain sample is present when an index of one of the frequency-domain samples matches an index of one of the stored indices.

16. A method of correcting a sampling frequency offset in an Orthogonal Frequency Division Multiplexing (OFDM) receiver, the method comprising the steps of:

receiving an OFDM signal containing a training symbol on an OFDM pilot subcarrier;

sampling the received OFDM signal at a sampling frequency;

widening a main lobe of the OFDM pilot subcarrier;

acquiring a plurality of frequency-domain samples of the OFDM pilot subcarrier;

comparing the indices of the frequency-domain samples to a stored index of a known pilot subcarrier;

determining that a peak frequency-domain sample is present when an index of one of the frequency-domain samples matches with the stored index;

calculating a difference in magnitude between frequency-domain samples positioned on either side of the peak frequency-domain sample of the OFDM pilot subcarrier;

deriving the sampling frequency offset from the calculated difference; and generating an error that is proportional to the sampling frequency offset.

17. An Orthogonal Frequency Division Multiplexing (OFDM) Receiver for receiving an OFDM signal having a training symbol on a pilot subcarrier, the OFDM receiver comprising:

an analog-to-digital converter (ADC) that samples a received analog OFDM signal at a sampling frequency to generate digital OFDM samples;

a window module that applies a window function to the digital samples output by the ADC, the window function widening a main lobe of the pilot subcarrier;

an FFT that Fast Fourier Transforms the windowed samples output by the window module such that a plurality of frequency-domain samples exist for the pilot subcarrier; and an error computation module that computes the sampling frequency error by detecting a peak frequency-domain sample by comparing indices of the frequency-domain samples to a stored index of a known pilot subcarrier and determining that the peak frequency-domain sample is present when an index of one of the frequency-domain samples matches with the stored index, and calculating a difference in magnitude between frequency-domain samples positioned on either side of the detected peak frequency-domain sample.

18. An apparatus for synchronizing a sampling frequency of a Orthogonal Frequency Division Multiplexing (OFDM) receiver with a sampling frequency of an OFDM transmitter, the apparatus comprising:

means for receiving an OFDM signal containing a plurality of training symbols on a plurality of OFDM pilot subcarriers;

means for sampling the received OFDM signal at a sampling frequency;

means for applying a time-domain window to the sampled OFDM signal such that the main lobes of the OFDM pilot subcarriers are widened;

means for Fast Fourier Transforming the windowed OFDM signals such that there are a plurality of frequency-domain samples for each of the OFDM pilot subcarriers; and means for comparing the indices of the frequency-domain samples to stored indices of known pilot subcarriers;

means for determining that a peak frequency-domain sample is present when an index of one of the frequency-domain samples matches an index of one of the stored indices;

means for calculating a difference in magnitude between frequency-domain samples positioned on either side of each peak frequency-domain sample of each of the pilot OFDM subcarriers; and means for deriving a sampling frequency error from the calculated differences.

* * * * *